L.B. Griffith.
Measuring and Forging Iron.
Nº 8,485.            Patented Nov. 4, 1851.
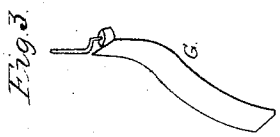
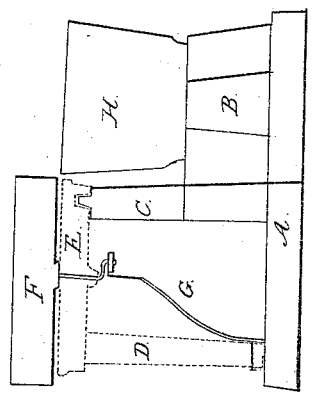
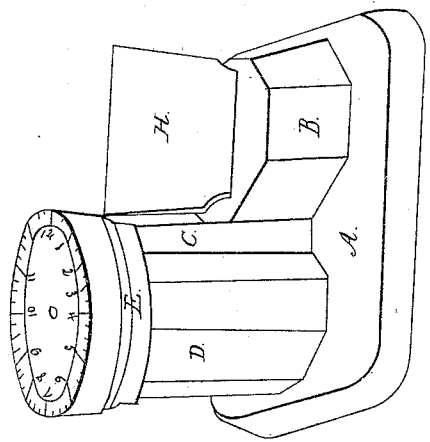

UNITED STATES PATENT OFFICE.

LEVI B. GRIFFITH, OF HONEYBROOK, PENNSYLVANIA.

MACHINE FOR MEASURING AND CUTTING IRON.

Specification of Letters Patent No. 8,485, dated November 4, 1851.

*To all whom it may concern:*

Be it known that I, LEVI B. GRIFFITH, of Honeybrook, in the county of Chester and State of Pennsylvania, have invented a new and useful Machine for Measuring and Cutting Iron; and I do hereby declare that the following is a full, clear, and exact description of the construction and operation of the same, reference being had to the annexed drawings, making a part of this specification, in which—

Figure 1 is a perspective view. Fig. 2 a side elevation, with the casing moved to show the spring and crank. Fig. 3 is a perspective view of the spring and crank.

The same letters refer to like parts.

A is an iron bed plate, cast with a raised socket B, and vertical standard C, thereto. This bed plate has holes for screws, or nails, near its outer edge, by which it can be screwed to any convenient place.

D is a vertical case, on the top of which is a horizontal circular plate E, cast thereto, and projecting on all sides from the case, and over the top of the standard C, to which it is secured by a tenon. The lower end of the case D rests on a portion of the bed plate, and is secured to it by a tenon, and is so arranged that it can be removed at pleasure.

F is a measuring wheel, placed horizontally on the top of the vertical case D, immediately over the circular plate E. Around the face of the wheel F, there is a scale, (near its periphery) marked in the usual way, so as to indicate the inches around the periphery of the wheel. This wheel F is secured to a shaft, which passes down through the circular plate E, into the inside of the vertical case D, (having its bearing in the center of the circular plate). The lower ends of the shaft is a crank furnished with a friction roll, against which, a spring G, secured to the inside of the case, is made to bear. This spring and crank, causes the measuring wheel F to settle with the starting point of the scale, always in a right position to commence measuring.

H is a vertical cutter, made of steel and placed in the raised socket B, of the bed plate, the cutting edge of which is horizontal, and stands close to the lower edge of the measuring wheel F, (when placed in a horizontal position).

By placing the iron, to be measured, on the cutting edge of the cutter H, and moving it forward, pressing it gently against the periphery of the measuring wheel F, causing it to rotate, the number of inches the iron has moved, will be shown by the scale on the face of the wheel, and the iron will be in a proper position for cutting, or marking, to any desired length.

The advantages of my invention are, strength and durability, cheapness of construction, a solid bed for the cutter, cutters of different forms can be inserted when required, the measure is always at hand, with the scale always ready to commence measuring, thus affording the operator a speedy and convenient mode of measuring, without being required the trouble to lay down his hammer and take up and place his rule, to measure, and then lay down the rule and take up the hammer to cut off.

What I claim as my invention and desire to secure by Letters Patent, is—

The measuring wheel, placed in any suitable position, in combination with the cutter, bed plate, and spring, or its equivalent, the whole being arranged and combined, substantially as described, for the purpose herein set forth.

LEVI B. GRIFFITH.

Witnesses:
  WILLIAM P. SOUDERS,
  AUGUSTUS F. NEUNABER.